United States Patent
Bigner et al.

(10) Patent No.: US 12,514,927 B2
(45) Date of Patent: Jan. 6, 2026

(54) IMMUNOTHERAPY WITH COMBINATION THERAPY COMPRISING AN IMMUNOTOXIN

(71) Applicants: Duke University, Durham, NC (US); United States of America, as Represented by the Secretary Department of Health and Human Services, Bethesda, MD (US)

(72) Inventors: Darell Bigner, Mebane, NC (US); Vidyalakshmi Chandramohan, Durham, NC (US); Ira H. Pastan, Potomac, MD (US)

(73) Assignees: Duke University, Durham, NC (US); United States of America, as Represented by the Secretary Department of Health and Human Services, Bethesda, MD (US)

( * ) Notice: Subject to any disclaimer, the term of this patent is extended or adjusted under 35 U.S.C. 154(b) by 673 days.

(21) Appl. No.: 17/773,494

(22) PCT Filed: Oct. 29, 2020

(86) PCT No.: PCT/US2020/057949
§ 371 (c)(1),
(2) Date: Apr. 29, 2022

(87) PCT Pub. No.: WO2021/087105
PCT Pub. Date: May 6, 2021

(65) Prior Publication Data
US 2023/0141413 A1    May 11, 2023

Related U.S. Application Data

(60) Provisional application No. 63/046,738, filed on Jul. 1, 2020, provisional application No. 62/927,753, filed on Oct. 30, 2019.

(51) Int. Cl.
*A61K 47/68* (2017.01)
*A61K 39/00* (2006.01)
(Continued)

(52) U.S. Cl.
CPC ...... *A61K 47/6829* (2017.08); *A61K 47/6849* (2017.08); *A61K 47/6851* (2017.08);
(Continued)

(58) Field of Classification Search
CPC ............ A61K 47/6829; A61K 47/6849; A61K 47/6851; A61K 2039/507;
(Continued)

(56) References Cited

U.S. PATENT DOCUMENTS 5,811,097 A    9/1998  Allison
6,264,940 B1   7/2001  Gromeier
(Continued)

FOREIGN PATENT DOCUMENTS

AU    2008266951 B2    12/2008
EP       1212422 B1     2/2007
(Continued)

OTHER PUBLICATIONS

Vajdos et al. "Comprehensive Functional Maps of the Antigen-binding Site of an Anti-ErbB2 Antibody Obtained with Shotgun Scanning Mutagenesis", 2002, Journal of Molecular Biology, vol. 320, p. 415-428. (Year: 2002).*

(Continued)

*Primary Examiner* — Gary B Nickol
*Assistant Examiner* — Bailey M Morgan
(74) *Attorney, Agent, or Firm* — Quarles & Brady, LLP

(57) ABSTRACT

Provided is a combination and a method of using combination therapy to treat tumor in an individual. An immunotoxin and an immunostimulator are administered to the individual, wherein the immunotoxin comprises a single chain variable
(Continued)

region antibody fused to a PE38 truncated *Pseudomonas* exotoxin, and the immunostimulator comprises an anti-CD40 agonist antibody. The combination may further comprise a checkpoint inhibitor comprising one or more of an anti-PD-1 antibody and an anti-PD-L1 antibody.

16 Claims, 2 Drawing Sheets

Specification includes a Sequence Listing.

(51) Int. Cl.
A61P 35/00 (2006.01)
C07K 16/28 (2006.01)
(52) U.S. Cl.
CPC .......... *A61P 35/00* (2018.01); *C07K 16/2863* (2013.01); *C07K 16/2878* (2013.01); *A61K 2039/507* (2013.01); *C07K 2317/622* (2013.01); *C07K 2317/75* (2013.01)
(58) Field of Classification Search
CPC .............. A61K 2039/505; A61P 35/00; C07K 16/2878; C07K 2317/622; C07K 2317/75; C07K 16/2863
See application file for complete search history.

(56) References Cited

U.S. PATENT DOCUMENTS

| | | | |
|---|---|---|---|
| 6,518,033 B1 | 2/2003 | Gromeier | |
| 6,682,736 B1 | 1/2004 | Hanson | |
| 6,984,720 B1 | 1/2006 | Korman | |
| 7,595,048 B2 | 9/2009 | Honjo | |
| 7,605,238 B2 | 10/2009 | Korman | |
| 8,008,449 B2 | 8/2011 | Korman | |
| 8,066,983 B2 | 11/2011 | Wimmer | |
| 8,182,813 B2 | 5/2012 | Brasel | |
| 8,217,149 B2 | 7/2012 | Irving | |
| 8,354,509 B2 | 1/2013 | Carven et al. | |
| 8,728,474 B2 | 5/2014 | Honjo | |
| 8,735,553 B1 | 5/2014 | Li | |
| 8,779,105 B2 | 7/2014 | Korman | |
| 8,900,587 B2 | 12/2014 | Carven | |
| 8,952,136 B2 | 2/2015 | Carven | |
| 9,067,999 B1 | 6/2015 | Honjo | |
| 9,073,994 B2 | 7/2015 | Honjo | |
| 9,492,564 B2 | 11/2016 | Bigner | |
| 9,499,624 B2 | 11/2016 | Dimoudis | |
| 9,499,625 B2 | 11/2016 | Dimoudis | |
| 9,499,626 B2 | 11/2016 | Dimoudis | |
| 9,938,345 B2 | 4/2018 | Papadopoulos | |
| 9,987,500 B2 | 6/2018 | Papadopoulos | |
| 10,072,084 B2 | 9/2018 | Bigner | |
| 2005/0261170 A1 | 11/2005 | Hansen | |
| 2009/0269343 A1 | 10/2009 | Bigner | |
| 2011/0165156 A1 | 7/2011 | Dimoudis | |
| 2017/0051064 A1 | 2/2017 | Bigner | |
| 2017/0121409 A1* | 5/2017 | Verona ................ C07K 16/4258 |
| 2017/0209574 A1 | 7/2017 | Cao et al. | |
| 2017/0216382 A1 | 8/2017 | Gromeier et al. | |
| 2018/0085319 A1 | 3/2018 | Kishimoto | |
| 2018/0186882 A1 | 7/2018 | Freeman | |
| 2018/0296614 A1 | 10/2018 | Bigner | |
| 2018/0311346 A1 | 11/2018 | Bigner | |
| 2020/0046847 A1 | 2/2020 | Bigner | |
| 2021/0214442 A1 | 7/2021 | Bigner | |
| 2021/0338811 A1 | 11/2021 | Bigner | |

FOREIGN PATENT DOCUMENTS

| | | |
|---|---|---|
| EP | 1141028 B1 | 2/2010 |
| EP | 2301575 A1 | 3/2011 |
| EP | 2170959 B1 | 10/2013 |
| WO | 2002078766 A2 | 10/2002 |
| WO | 2007016240 A2 | 2/2007 |
| WO | 2007112047 A2 | 10/2007 |
| WO | 2011066389 A1 | 6/2011 |
| WO | 2011123381 A1 | 10/2011 |
| WO | 2012015912 | 2/2012 |
| WO | 2015171965 A2 | 11/2015 |
| WO | 2016106180 A1 | 6/2016 |
| WO | 2017020801 A1 | 2/2017 |
| WO | 2017066557 A1 | 4/2017 |
| WO | WO-2017079520 A1 * | 5/2017 ......... A61K 47/6829 |
| WO | 2017097407 A1 | 6/2017 |
| WO | 2017122098 A2 | 7/2017 |
| WO | 2017165266 A1 | 9/2017 |
| WO | 2017214182 A1 | 12/2017 |
| WO | 2018031507 A1 | 2/2018 |
| WO | 2018064215 A1 | 4/2018 |
| WO | 2018067446 A1 | 4/2018 |
| WO | 2018075357 A1 | 4/2018 |
| WO | 2018156448 A1 | 8/2018 |
| WO | 2019222504 A1 | 11/2019 |

OTHER PUBLICATIONS

Casset et al. "A peptide mimetic of an anti-CD4 monoclonal antibody by rational design" 2003, Biochemical and Biophysical Research Communications, vol. 307, p. 198-205. (Year: 2003).*
Bigner et al. 2017. Sequence Listing for WO2017/079520. As obtained online at wipo.int/portal/en/ [retrieved on Dec. 20, 2024]. Retrieved from the internet: <https://patentscope.wipo.int/search/en/detail.jsf?docId=WO2017079520> (Year: 2017).*
D'Amico Randy et al. "Extent of resection in Glioma—A Review of the Cutting Edge," Word Neurosurgery, 2017; 103:538-549.
Arita, N., et al., Epidermal growth factor receptor in human glioma. J Neurosurg, 1989. 70(6): p. 916-919.
Bao X, Pastan I, Bigner DD, Chandramohan V. EGFR/EGFRvIII-targeted immunotoxin therapy for the treatment of glioblastomas via convection-enhanced delivery. Receptors Clin Investig. 2016;3(4):e1430. doi: 10.14800/rci.1430. PMID: 28286803; PMCID: PMC5341612.
Bao, X. et al. "Antitumor efficacy of D2C7-(scdsFv)-PE38KDEL, a novel immunotoxin targeting EGFRwt and EGFRvIII, by convection-enhanced delivery in orthotopic brain tumor mouse models," Journal for Immunotherapy of Cancer (2013) p. 126.
Bao, Xuhui, et al. "Preclinical toxicity evaluation of a novel immunotoxin, D2C7-(scdsFv)-PE38KDEL, administered via intracerebral convection-enhanced delivery in rats." Investigational new drugs 34.2 (2016): 149-158.
Bartlett, J.M., et al., The prognostic value of epidermal growth factor receptor mRNA expression in primary ovarian cancer. Br J Cancer, 1996. 73(3): p. 301-306.
Brennan, C.W., et al., The somatic genomic landscape of glioblastoma. Cell, 2013. 155(2): p. 462-477.
Brown MC, et al. "Cancer immunotherapy with recombinant poliovirus induces IFN-dominant activation of dendritic cells and tumor antigen-specific CTLs." Science translational medicine 9.408 (2017): eaan4220.
Brown MC, et al. Oncolytic polio virotherapy of cancer. Cancer. 2014; 120(21):3277-3286.
Buchner, J. et al. "A Method for Increasing the Yield of Properly Folded Recombinant Fusion Proteins: Single-Chain Immunotoxins from Renaturation of Bacterial Inclusion Bodies," Analytical Biochemistry (1992) 205(2):263-270.
Casset F, Roux F, Mouchet P, Bes C, Chardes T, Granier C, Mani JC, Pugnière M, Laune D, Pau B, Kaczorek M, Lahana R, Rees A. A peptide mimetic of an anti-CD4 monoclonal antibody by rational design. Biochem Biophys Res Commun. Jul. 18, 2003;307(1):198-205. doi: 10.1016/s0006-291x(03)01131-8. PMID: 12850000.
Chaffanet, M., et al., EGF receptor amplification and expression in human brain tumours. Eur J Cancer, 1992. 28(1): p. 11-17.
Chandramohan V, Bao X, Keir ST, Pegram CN, Szafranski SE, Piao H, Wikstrand CJ, McLendon RE, Kuan CT, Pastan IH, Bigner DD. Construction of an immunotoxin, D2C7-(scdsFv)-PE38KDEL, targeting EGFRwt and EGFRvIII for brain tumor therapy. Clin Cancer Res. Sep. 1, 2013;19(17):4717-27. doi: 10.1158/1078-0432.CCR-12-3891. Epub Jul. 15, 2013. PMID: 23857604; PMCID: PMC3766439.

(56) References Cited

OTHER PUBLICATIONS

Chandramohan, V. et al. "Production and quality control assessment of a GLP-grade immunotoxin, D2C7-(scdsFv)-PE38KDL, for a phase I/II clinical trial," Applied Microbiology and Biotechnology (2016) 101(7):2747-2766.
Chandramohan, V., et al. "Improved efficacy against malignant brain tumors with EGFRwt/EGFRvIII targeting immunotoxin and checkpoint inhibitor combinations." Journal for immunotherapy of cancer 7.1 (2019): 1-14.
Cheson et al., Recommendations for initial evaluation, staging, and response assessment of Hodgkin and non-Hodgkin lymphoma: the Lugano classification J. Clin. Oncology, 2014; 32(27):3059-3068.
Choi N, Shin DY, Kim HJ, Moon UY, Baek KH, Jeong HS. Postoperative anti-PD-1 antibody treatment to reduce recurrence in a cancer ablation surgical wound. J Surg Res. Jan. 2018;221:95-103. doi: 10.1016/j.jss.2017.08.022. Epub Sep. 18, 2017. PMID: 29229160.
European Patent Office. Extended European Search Report for application 19802992.8. Mailed on Jan. 26, 2022. 8 pages.
Fox, S.B., et al., Prognostic value of c-erbB-2 and epidermal growth factor receptor in stage A1 (T1a) prostatic adenocarcinoma. Br J Urol, 1994. 74(2): p. 214-220.
Frederick, L., et al., Diversity and frequency of epidermal growth factor receptor mutations in human glioblastomas. Cancer Res, 2000. 60(5): p. 1383-1387.
Gardai SJ, et al. Abstract 2472: SEA-CD40, a sugar engineered non-fucosylated anti-CD40 antibody with improved immune activating capabilities. Proceedings of the 106th Annual Meeting of the American Association for Cancer Research; Apr. 18-22, 2015; Philadelphia, PA. Philadelphia (PA): AACR; Cancer Res 2015;75(15 Suppl):Abstract nr 2472 10.1158/1538-7445.AM2015-2472.
Grandis, J.R. et al., Quantitative immunohistochemical analysis of transforming growth factor-alpha and epidermal growth factor receptor in patients with squamous cell carcinoma of the head and neck Cancer, 1996. 78(6): p. 1284-1292.
Immunotixon monotherapy and combinatiorial therapy with immune checkpoint inhibitors for malignant brain tumors. Xuhui Bao. Dept. Pathology Duke University. Dissertation 2016.
International Searching Authority. International Search Report and Written Opinion for application PCT/US2019/032671. Mailed on Aug. 9, 2019. 12 pages.
International Searching Authority. International Search Report and Written Opinion for application PCT/US2020/057949. Mailed on Feb. 10, 2021. 9 pages.
Johnson P, Challis R, Chowdhury F, et al. . Clinical and biological effects of an agonist anti-CD40 antibody: a Cancer Research UK phase I study. Clin Cancer Res 2015;21:1321-8. 10.1158/1078-0432. CCR-14-2355.
Klijn, J.G., et al., The clinical significance of epidermal growth factor receptor (EGF-R) in human breast cancer: a review on 5232 patients. Endocr Rev, 1992.13(1): p. 3-17.
Kreitman R J et al: "Recombinant Immunotoxins Containing Anti-Tac(FV) and Derivatives of Pseudomonas Exotoxin Produce Complete Regression in Mice of an Interleukin-2 Receptor-Expressing Human Carcinoma", Blood, American Society of Hematology, US, vol. 83, No. 2, Jan. 15, 1994 (Jan. 15, 1994), pp. 426-434.
Lammering G, Valerie K, Lin PS, Hewit TH, Schmidt-Ullrich RK. Radiation-induced activation of a common variant of EGFR confers enhanced radioresistance. Radiother Oncol. Sep. 2004;72(3):267-73. doi: 10.1016/j.radonc.2004.07.004. PMID: 15450724.
Landi Daniel B. et al: "Immunotherapy for pediatric brain tumors", Neuroimmunology and Neuroinflammation, vol. 5, No. 7, Jul. 10, 2018 (Jul. 10, 2018), p. 29, XP93091702, ISSN: 2347-8659, DOI: 10.20517/2347-8659.2018.35.
Lecocq, Quentin, et al. "Theranostics in immuno-oncology using nanobody derivatives." Theranostics 9.25 (2019): 7772.
Libermann, T.A., et al., Amplification, enhanced expression and possible rearrangement of EGF receptor gene in primary human brain tumours of glial origin. Nature, 1985. 313(5998): p. 144-147.
Libermann, T.A., et al., Expression of epidermal growth factor receptors in human brain tumors. Cancer Res, 1984. 44(2): p. 753-760.
Liu, SV, et al., Neoadjuvant therapy for breast cancer. J Surg Oncol. Mar. 15, 2010;101(4):283-291. doi: 10.1002/jso.21446. PMID: 20187061.
MacCallum RM, Martin AC, Thornton JM. Antibody-antigen interactions: contact analysis and binding site topography. J Mol Biol. Oct. 11, 1996;262(5):732-45. doi: 10.1006/jmbi.1996.0548. PMID: 8876650.
National Cancer Institute. NCI Drug Dictionary. Immunotoxin D2C7-(scdsFv)-PE38KDEL. Available online at https://.cancer.gov/publications/dictionaries/cancer-drug/def/immunotoxin-d2c7-scdsfv-pe38kdel. Version accessed dated Apr. 24, 2018.
Nicholson RI, Gee JM, Harper ME. EGFR and cancer prognosis. Eur J Cancer. Sep. 2001;37 Suppl 4:S9-15. doi: 10.1016/s0959-8049(01)00231-3. PMID: 11597399.
Nigam et al. "Development of high affinity engineered antibody fragments targeting PD-L1 for immunoPET," J Nucl Med May 1, 2018 vol. 59 No. supplement 1 1101.
Pavelic, K., et al., Evidence for a role of EGF receptor in the progression of human lung carcinoma. Anticancer Res, 1993.13(4): p. 1133-1137.
Piechutta M, Berghoff AS. New emerging targets in cancer immunotherapy: the role of Cluster of Differentiation 40 (CD40/TNFR5). ESMO Open. 2019;4(Suppl 3):e000510. Published Jun. 12, 2019. doi: 10.1136/esmoopen-2019-000510.
Razpotnik, Rok et al: "Targeting Malignant Brain Tumors with Antibodies", Frontiers in Immunology, vol. 8, Sep. 25, 2017 (Sep. 25, 2017), XP055899394.
Seetharam, S., et al., Increased cytotoxic activity of Pseudomonas exotoxin and two chimeric toxins ending in Kdel. J Biol Chem, 1991. 266(26): p. 17376-17381.
Sela-Culang I, Kunik V, Ofran Y. The structural basis of antibody-antigen recognition. Front Immunol. Oct. 8, 2013;4:302. doi: 10.3389/fimmu.2013.00302. PMID: 24115948; PMCID: PMC3792396.
Solomon J, Csontos L, Clarke D, Bonyhadi M, Zylberberg C, McNiece I, Kurtzberg J, Bell R, Deans R. Current perspectives on the use of ancillary materials for the manufacture of cellular therapies. Cytotherapy. Jan. 2016;18(1):1-12. doi: 10.1016/j.jcyt. 2015.09.010. Epub Dec. 1, 2015. PMID: 26596503.
Vajdos FF, Adams CW, Breece TN, Presta LG, de Vos AM, Sidhu SS. Comprehensive functional maps of the antigen-binding site of an anti-ErbB2 antibody obtained with shotgun scanning mutagenesis. J Mol Biol. Jul. 5, 2002;320(2):415-28. doi: 10.1016/S0022-2836(02)00264-4. PMID: 12079396.
Vitale et al. . Development of CDX-1140, an agonist CD40 antibody for cancer immunotherapy. Cancer Immunol Immunother 2019;68:233-45. 10.1007/s00262-018-2267-0.
Wang, C., Sun, W., Ye, Y. et al. In situ activation of platelets with checkpoint inhibitors for post-surgical cancer immunotherapy. Nat Biomed Eng 1, 0011 (2017).
Weldon, J.E. et al, A guide to taming a toxin—recombinant immunotoxins constructed from Pseudomonas exotoxin A for the treatment of cancer. Febs J, 2011. 278(23): p. 4683-4700.
Wikstrand CJ, et al. Cell surface localization and density of the tumor-associated variant of the epidermal growth factor receptor, EGFRvIII. Cancer Res. 1997;57(18):4130-4140.
Zalutsky et al. Radioimmunotargeting of malignant glioma by monoclonal antibody D2C7 reactive against both wild-type and variant III mutant epidermal growth factor receptors. Nucl Med Biol. 2012;39(1):23-34.

* cited by examiner

Group 1 (10 mice): 2%MSA-PBS + Isotype control Ab
Group 2 (10 mice): CD40 mAb 300 µg
Group 3 (10 mice): D2C7-IT 0.2 µg + Isotype control Ab
Group 4 (10 mice): D2C7-IT 0.2 µg + CD40 mAb 300 µg

FIG. 3

| Treatment Group | Median Survival | Remaining Mice | Losing Weight | Comparison to Vehicle (Wilcoxon Test) | Comparison to D2C7 (Wilcoxon Test) | Comparison to αCD40 Monotherapy (Wilcoxon Test) |
|---|---|---|---|---|---|---|
| Vehicle Control | 16 | 0/10 | - | - | - | - |
| αCD40 | 22 | 2/10 | 0 | 0.0063 (**) | 0.1774 | - |
| D2C7-IT | 30 | 1/10 | 0 | 0.0001 (***) | - | - |
| D2C7-IT + αCD40 | >54 | 8/10 | 0 | <0.0001 (**) | 0.0009 (*) | 0.0026 (***) | ially fused to a truncated *Pseudomonas* exotoxin comprising PE38, wherein the single chain variable region antibody has CDR1, CDR2, and CDR3 regions as shown in SEQ ID NO: 1-6.

SEQUENCE LISTING

```
<160> NUMBER OF SEQ ID NOS: 19

<210> SEQ ID NO 1
<211> LENGTH: 5
<212> TYPE: PRT
<213> ORGANISM: Artificial Sequence
<220> FEATURE:
<223> OTHER INFORMATION: Synthetic- CDR1 of VH

<400> SEQUENCE: 1

Gly Tyr Asn Met Asn
1               5

<210> SEQ ID NO 2
<211> LENGTH: 17
<212> TYPE: PRT
<213> ORGANISM: Artificial Sequence
<220> FEATURE:
<223> OTHER INFORMATION: Synthetic- CDR2 of VH

<400> SEQUENCE: 2

Asn Ile Asp Pro Tyr Tyr Gly Asp Thr Asp Tyr Asp Gln Lys Phe Lys
1               5                   10                  15

Gly

<210> SEQ ID NO 3
<211> LENGTH: 11
<212> TYPE: PRT
<213> ORGANISM: Artificial Sequence
<220> FEATURE:
<223> OTHER INFORMATION: Synthetic- CDR3 of VH

<400> SEQUENCE: 3

Gly Ala His Arg Asp Tyr Tyr Ala Met Asp Tyr
1               5                   10

<210> SEQ ID NO 4
<211> LENGTH: 11
<212> TYPE: PRT
<213> ORGANISM: Artificial Sequence
<220> FEATURE:
<223> OTHER INFORMATION: Synthetic- CDR1 of VL

<400> SEQUENCE: 4

Arg Thr Ser Glu Asn Ile Tyr Ile Tyr Leu Ala
1               5                   10

<210> SEQ ID NO 5
<211> LENGTH: 7
<212> TYPE: PRT
<213> ORGANISM: Artificial Sequence
<220> FEATURE:
<223> OTHER INFORMATION: Synthetic- CDR2 of VL

<400> SEQUENCE: 5

Asn Ala Lys Thr Leu Ala Glu
1               5
```

-continued

<210> SEQ ID NO 6
<211> LENGTH: 9
<212> TYPE: PRT
<213> ORGANISM: Artificial Sequence
<220> FEATURE:
<223> OTHER INFORMATION: Synthetic- CDR3 of VL

<400> SEQUENCE: 6

Gln Gln His Tyr Gly Thr Pro Tyr Thr
1               5

<210> SEQ ID NO 7
<211> LENGTH: 349
<212> TYPE: PRT
<213> ORGANISM: Artificial Sequence
<220> FEATURE:
<223> OTHER INFORMATION: Synthetic- Truncated Pseudomonas exotoxin
      (PE38)

<400> SEQUENCE: 7

Gly Gly Pro Glu Gly Gly Ser Leu Ala Ala Leu Thr Ala His Gln Ala
1               5                   10                  15

Cys His Leu Pro Leu Glu Thr Phe Thr Arg His Arg Gln Pro Arg Gly
                20                  25                  30

Trp Glu Gln Leu Glu Gln Cys Gly Tyr Pro Val Gln Arg Leu Val Ala
            35                  40                  45

Leu Tyr Leu Ala Ala Arg Leu Ser Trp Asn Gln Val Asp Gln Val Ile
        50                  55                  60

Arg Asn Ala Leu Ala Ser Pro Gly Ser Gly Gly Asp Leu Gly Glu Ala
65                  70                  75                  80

Ile Arg Glu Gln Pro Glu Gln Ala Arg Leu Ala Leu Thr Leu Ala Ala
                85                  90                  95

Ala Glu Ser Glu Arg Phe Val Arg Gln Gly Thr Gly Asn Asp Glu Ala
            100                 105                 110

Gly Ala Ala Asn Gly Pro Ala Asp Ser Gly Asp Ala Leu Leu Glu Arg
        115                 120                 125

Asn Tyr Pro Thr Gly Ala Glu Phe Leu Gly Asp Gly Gly Asp Val Ser
    130                 135                 140

Phe Ser Thr Arg Gly Thr Gln Asn Trp Thr Val Glu Arg Leu Leu Gln
145                 150                 155                 160

Ala His Arg Gln Leu Glu Glu Arg Gly Tyr Val Phe Val Gly Tyr His
                165                 170                 175

Gly Thr Phe Leu Glu Ala Ala Gln Ser Ile Val Phe Gly Gly Val Arg
            180                 185                 190

Ala Arg Ser Gln Asp Leu Asp Ala Ile Trp Arg Gly Phe Tyr Ile Ala
        195                 200                 205

Gly Asp Pro Ala Leu Ala Tyr Gly Tyr Ala Gln Asp Gln Glu Pro Asp
    210                 215                 220

Ala Arg Gly Arg Ile Arg Asn Gly Ala Leu Leu Arg Val Tyr Val Pro
225                 230                 235                 240

Arg Ser Ser Leu Pro Gly Phe Tyr Arg Thr Ser Leu Thr Leu Ala Ala
                245                 250                 255

Pro Glu Ala Ala Gly Glu Val Glu Arg Leu Ile Gly His Pro Leu Pro
            260                 265                 270

Leu Arg Leu Asp Ala Ile Thr Gly Pro Glu Glu Glu Gly Gly Arg Leu
        275                 280                 285

-continued

```
Glu Thr Ile Leu Gly Trp Pro Leu Ala Glu Arg Thr Val Val Ile Pro
    290                 295                 300
Ser Ala Ile Pro Thr Asp Pro Arg Asn Val Gly Gly Asp Leu Asp Pro
305                 310                 315                 320
Ser Ser Ile Pro Asp Lys Glu Gln Ala Ile Ser Ala Leu Pro Asp Tyr
                325                 330                 335
Ala Ser Gln Pro Gly Lys Pro Pro Arg Glu Asp Leu Lys
            340                 345

<210> SEQ ID NO 8
<211> LENGTH: 36
<212> TYPE: PRT
<213> ORGANISM: Artificial Sequence
<220> FEATURE:
<223> OTHER INFORMATION: Synthetic- Cysteine rich domain 1 ("CDR1")
      region of CD40

<400> SEQUENCE: 8

Cys Arg Glu Lys Gln Tyr Leu Ile Asn Ser Gln Cys Cys Ser Leu Cys
1               5                   10                  15
Gln Pro Gly Gln Lys Leu Val Ser Asp Cys Thr Glu Phe Thr Glu Thr
            20                  25                  30
Glu Cys Leu Pro
        35

<210> SEQ ID NO 9
<211> LENGTH: 16
<212> TYPE: PRT
<213> ORGANISM: Artificial Sequence
<220> FEATURE:
<223> OTHER INFORMATION: Synthetic- Cysteine rich domain 2 ("CDR2")
      region of CD40

<400> SEQUENCE: 9

Cys Gly Glu Ser Glu Phe Leu Asp Thr Trp Asn Arg Glu Thr His Cys
1               5                   10                  15

<210> SEQ ID NO 10
<211> LENGTH: 12
<212> TYPE: PRT
<213> ORGANISM: Artificial Sequence
<220> FEATURE:
<223> OTHER INFORMATION: Synthetic- A1 domain of CDR1 region of CD40

<400> SEQUENCE: 10

Cys Arg Glu Lys Gln Tyr Leu Ile Asn Ser Gln Cys
1               5                   10

<210> SEQ ID NO 11
<211> LENGTH: 117
<212> TYPE: PRT
<213> ORGANISM: Artificial Sequence
<220> FEATURE:
<223> OTHER INFORMATION: Synthetic- VH

<400> SEQUENCE: 11

Glu Val His Leu Gln Gln Ser Gly Pro Glu Leu Glu Lys Pro Gly Ala
1               5                   10                  15
Ser Val Lys Ile Ser Cys Lys Ala Ser Gly Tyr Ser Phe Thr Gly Tyr
            20                  25                  30
Asn Met Asn Val Lys Gln Ser Asn Gly Lys Ser Leu Glu Trp Ile Gly
            35                  40                  45
Asn Ile Asp Pro Tyr Tyr Gly Asp Thr Asp Tyr Asp Gln Lys Phe Lys
```

```
                    50                  55                  60
Gly Thr Leu Thr Ala Asp Lys Ser Ser Asn Thr Val Tyr Met Gln Leu
 65                  70                  75                  80

Gln Ser Leu Thr Ser Glu Asp Ser Ala Val Tyr Tyr Cys Ala Arg Gly
                     85                  90                  95

Ala His Arg Asp Tyr Tyr Ala Met Asp Tyr Trp Gly Gln Gly Thr Ser
                100                 105                 110

Val Thr Val Ser Ser
            115

<210> SEQ ID NO 12
<211> LENGTH: 107
<212> TYPE: PRT
<213> ORGANISM: Artificial Sequence
<220> FEATURE:
<223> OTHER INFORMATION: Synthetic- VL

<400> SEQUENCE: 12

Asp Ile Gln Met Thr Gln Ser Pro Ala Ser Leu Ser Ala Ser Val Gly
 1               5                  10                  15

Glu Thr Val Thr Ile Thr Cys Arg Thr Ser Glu Asn Ile Tyr Ile Tyr
                20                  25                  30

Leu Ala Trp Tyr Gln Gln Lys Gln Gly Lys Ser Pro Gln Leu Leu Val
             35                  40                  45

Tyr Asn Ala Lys Thr Leu Ala Glu Gly Val Pro Ser Arg Phe Ser Gly
         50                  55                  60

Ser Gly Ser Gly Thr Gln Phe Ser Leu Lys Ile Asn Gly Leu Gln Pro
 65                  70                  75                  80

Glu Asp Phe Gly Gly Tyr Tyr Cys Gln Gln His Tyr Gly Thr Pro Tyr
                 85                  90                  95

Thr Phe Gly Gly Gly Thr Lys Leu Glu Lys Lys
                100                 105

<210> SEQ ID NO 13
<211> LENGTH: 15
<212> TYPE: PRT
<213> ORGANISM: Artificial Sequence
<220> FEATURE:
<223> OTHER INFORMATION: Synthetic- Peptide linker

<400> SEQUENCE: 13

Gly Gly Gly Gly Ser Gly Gly Gly Gly Ser Gly Gly Gly Gly Ser
 1               5                  10                  15

<210> SEQ ID NO 14
<211> LENGTH: 4
<212> TYPE: PRT
<213> ORGANISM: Artificial Sequence
<220> FEATURE:
<223> OTHER INFORMATION: Synthetic- peptide

<400> SEQUENCE: 14

Lys Asp Glu Leu
 1

<210> SEQ ID NO 15
<211> LENGTH: 4
<212> TYPE: PRT
<213> ORGANISM: Artificial Sequence
<220> FEATURE:
<223> OTHER INFORMATION: Synthetic- peptide
```

```
<400> SEQUENCE: 15

Arg Asp Glu Leu
1

<210> SEQ ID NO 16
<211> LENGTH: 4
<212> TYPE: PRT
<213> ORGANISM: Artificial Sequence
<220> FEATURE:
<223> OTHER INFORMATION: Synthetic- peptide

<400> SEQUENCE: 16

Lys Glu Glu Leu
1

<210> SEQ ID NO 17
<211> LENGTH: 4
<212> TYPE: PRT
<213> ORGANISM: Artificial Sequence
<220> FEATURE:
<223> OTHER INFORMATION: Synthetic- peptide

<400> SEQUENCE: 17

Lys Asn Glu Leu
1

<210> SEQ ID NO 18
<211> LENGTH: 4
<212> TYPE: PRT
<213> ORGANISM: Artificial Sequence
<220> FEATURE:
<223> OTHER INFORMATION: Synthetic- peptide

<400> SEQUENCE: 18

Arg Glu Glu Leu
1

<210> SEQ ID NO 19
<211> LENGTH: 4
<212> TYPE: PRT
<213> ORGANISM: Artificial Sequence
<220> FEATURE:
<223> OTHER INFORMATION: Synthetic- peptide

<400> SEQUENCE: 19

Asp Lys Glu Leu
1
```

IMMUNOTHERAPY WITH COMBINATION THERAPY COMPRISING AN IMMUNOTOXIN

CROSS-REFERENCE TO RELATED APPLICATIONS

This patent application is a national stage filing under 35 U.S.C. § 371 of International Patent Application No. PCT/US2020/057949, filed Oct. 29, 2020, which claims the benefit of priority of U.S. Provisional Patent Application No. 62/927,753 filed on Oct. 30, 2019 and U.S. Provisional Patent Application No. 63/046,738 filed on Jul. 1, 2020, the contents of which are all incorporated by reference in their entirety.

STATEMENT REGARDING FEDERALLY SPONSORED RESEARCH

This invention was made with government support under R35CA197264 awarded by the National Institutes of Health. The government has certain rights in the invention.

SEQUENCE LISTING STATEMENT

A Sequence Listing accompanies this application and is submitted as an ASCII text file of the sequence listing named "155554_00570_ST25.txt" which is 8770 8976 bytes in size and was created on Oct. 27, 2020. The sequence listing is electronically submitted via EFS-Web with the application and is incorporated herein by reference in its entirety.

TECHNICAL FIELD OF THE INVENTION

This invention is related to the area of immunotherapy. In particular, it relates to combination regimens for treating tumors, and kits and medicaments for accomplishing them.

BACKGROUND OF THE INVENTION

In human tumors, epithelial growth factor receptor frequently undergoes gene rearrangements. The most common extracellular domain mutation, EGFRVIII, comprises a deletion of exons 2-7 of the EGFR gene. Aberrant signaling through EGFRvIII has been shown to be important in driving tumor progression, and often correlates with poor prognosis. EGFRvIII expression occurs in a considerable portion of individuals with glioblastoma. Glioblastoma is the most dismal malignant brain tumor among all primary brain and central nervous system tumors. The median survival time for glioblastoma patients with the current standard treatment is less than 15 months. EGFRvIII is also expressed in primary breast tumors where it contributes to cancer stem cell phenotypes in breast cancer. EGFRvIII expression was significantly correlated with pathological subtypes of lung cancer (squamous cell carcinoma vs. adenocarcinoma). EGFRvIII expression has also been reported to regulate phenotypic plasticity in ovarian cancer and, thereby, contribute to more aggressive disease. Thus, there is an urgent need to develop advanced and efficient therapeutic approaches to improve the poor survival outlook of glioblastoma patients as well as other tumors expressing EGFR (epidermal growth factor receptors, including EGFR and/or EGFRvIII).

Cluster of differentiation 40 (CD40) can be expressed by B cells, myeloid cells, and dendritic cells, which can act as antigen presenting cells to foster a T-cell dependent, myeloid cell dependent, cytotoxic antitumor response. Thus, anti-CD40 agonist antibodies are fundamentally and functionally different from antibodies which block negative immune checkpoints such as anti-CTLA-4 or anti-PD1 antibodies (also known as checkpoint inhibitors).

Many types of solid tumors exploit the PD-1 pathway to escape immune surveillance by upregulating their expression of PD-L1. PD-L1 can bind with PD-1 on tumor-specific T cells and other immune cells to reduce the proliferation of PD-1 positive cells, inhibit their cytokine secretion, and induce apoptosis. Checkpoint inhibitors have been developed to promote anti-tumor immunity, such as by antibody-mediated blockade of the PD-1/PD-L1 axis.

SUMMARY OF THE INVENTION

According to one aspect of the invention a method is provided for treating a tumor in a patient. An immunotoxin and an immunostimulator are administered to the patient having a tumor expressing EGFR. The immunotoxin comprises a single chain variable region antibody which binds to EGFRwt and EGFRVIII and which is fused to a truncated *Pseudomonas* exotoxin comprising PE38. The single chain variable region antibody has CDR1, CDR2, and CDR3 regions as shown in SEQ ID NO: 1-6. The immunostimulator is an anti-CD40 agonist antibody. The truncated *Pseudomonas* exotoxin comprising PE38 comprises an amino acid sequence shown in SEQ ID NO: 7 and may further comprise (at the C-terminus) a sequence comprising an amino acid sequence selected from the group consisting of KDEL (SEQ ID NO:14), RDEL (SEQ ID NO:15), KEEL (SEQ ID NO:16), KNEL (SEQ ID NO:17), or REEL (SEQ ID NO:18).

In another aspect of the invention, the method further comprises administering an immune checkpoint inhibitor, which binds to PD-1 or PD-L1. Thus, in this aspect the method comprises administering to an individual a therapeutically effective amount of: an immunotoxin comprising a single chain variable region antibody which binds to EGFRwt and EGFRvIII and which is fused to a truncated *Pseudomonas* exotoxin comprising PE38, an anti-CD40 agonist antibody, and a checkpoint inhibitor comprising one or more of an anti-PD1 antibody, anti-PD-L1 antibody, or antibodies fragments of PD-1 or PDL-1 antibodies.

According to another aspect of the invention a kit is provided for treating a tumor. The kit comprises an immunotoxin and an immunostimulator comprising an anti-CD40 agonist antibody. The immunotoxin comprises a single chain variable region antibody genetically fused to a truncated *Pseudomonas* exotoxin comprising PE38, wherein the single chain variable region antibody has CDR1, CDR2, and CDR3 regions as shown in SEQ ID NO: 1-6. Such single chain variable region antibody has binding specificity for EGFRwt and EGFRvIII. The kit may further comprise a checkpoint inhibitor comprising one or more of an anti-PD1 antibody or anti-PD-L1 antibody.

Also provided is a medicament comprising an anti-CD40 agonist antibody and an immunotoxin for use in treating solid tumor, wherein the immunotoxin comprises a single chain variable region antibody genetically fused to a truncated *Pseudomonas* exotoxin comprising PE38, wherein the single chain variable region antibody has CDR1, CDR2, and CDR3 regions as shown in SEQ ID NO: 1-6.

Also provided is a medicament comprising an anti-CD40 agonist antibody, an immunotoxin, and a checkpoint inhibitor for use in treating solid tumor, wherein the immunotoxin comprises a single chain variable region antibody genetically fused to a truncated *Pseudomonas* exotoxin comprising PE38, wherein the single chain variable region antibody has CDR1, CDR2, and CDR3 regions as shown in SEQ ID NO: 1-6, and wherein the checkpoint inhibitor comprises one or more of an anti-PD1 antibody or anti-PD-L1 antibody.

These and other embodiments which will be apparent to those of skill in the art upon reading the specification provide the art with treatments methods, regimens, kits and agents for treating tumors expressing epidermal growth factor receptors, i.e., EGFRwt and/or EGFRvIII.

BRIEF DESCRIPTION OF THE DRAWINGS

FIG. 3 is a table summarizing the results from the experiment illustrated in FIG. 2 comparing treatment groups for median survival, mice remaining after 50 days post-implantation, and statistical significance when compared to treatment with either Vehicle Control or D2C7 (D2C7-IT) monotherapy or with anti-CD40 (αCD40) monotherapy.

DETAILED DESCRIPTION OF THE INVENTION

Figure 1:
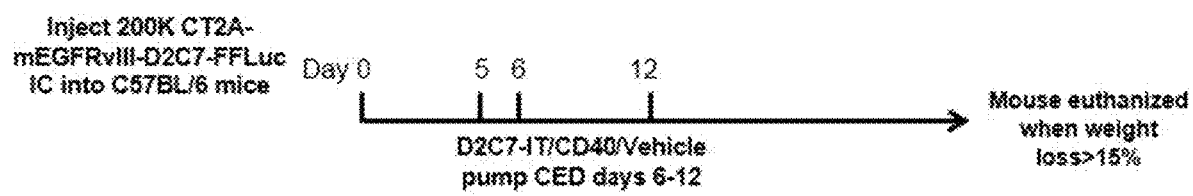
FIG. 1 shows an experimental outline for assessing efficacy of treatment with immunotoxin ("D2C7-IT"), anti-CD40 agonist antibody ("CD40 mAb"), a regimen combining administration of D2C7-IT and an isotype control antibody (same isotype as CD40 mAb), a regimen combining administration of D2C7-IT and CD40 mAb, and a negative control comprising 2% murine serum albumin in PBS (2% MSA-PBS) in combination with isotype control antibody (also known as Vehicle Control).

The inventors have developed targeted immunotoxins (IT), D2C7-(scdsFv)-PE38 (D2C7-IT), by fusing the single chain variable fragment (scFv) from the D2C7 monoclonal antibody (mAb) with the *Pseudomonas* exotoxin A (PE), optionally fused to KDEL (SEQ ID NO:14) peptide (as described in U.S. Pat. Nos. 9,492,564 & 10,072,084). D2C7-IT reacts with both the wild-type epidermal growth factor receptor (EGFRwt) and the EGFR variant III (EGFRvIII), two proteins that are overexpressed in glioblastoma. The robust antitumor efficacy of D2C7-IT is mediated through PE in orthotopic glioma xenograft models in immunocompromised mice. In addition to direct tumor cell killing, the immunotoxin monotherapy induces a secondary antitumor immune response through the engagement of T cells. When the immunotoxin is administered in a combination regimen with an immunostimulator comprising anti-CD40 agonist antibody, improved and synergistic results are observed. Also, when the immunotoxin is administered in a combination regimen with an immunostimulator comprising anti-CD40 agonist antibody, and with a checkpoint inhibitor comprising an anti-PD-1 antibody and/or anti-PD-L1 antibody, improved and synergistic results are observed. These combinations are capable of invoking tumor-specific T cell immunity, and may improve clinical outcomes in individuals treated with the combination who have tumor expressing one or more of wild-type epidermal growth factor receptor (EGFRwt) and the EGFR variant III (EGFRvIII).

In one embodiment, the immunotoxin comprises a single chain variable region (scFv) that binds to EGFR comprising a VH domain comprising CDR1, CDR2 and CDR3 of SEQ ID NO:1, 2 and 3, respectively connected via peptide linker to a VL domain comprising CDR1, CDR2 and CDR3 of SEQ ID NO: 4, 5 and 6, respectively. For example, the carboxyl terminus of the D2C7 $V_H$ domain (SEQ ID NO: 11) is connected to the amino terminus of the $V_L$ domain (SEQ ID NO: 12) by a 15-amino-acid peptide $(Gly_4Ser)_3$ linker (SEQ ID NO: 13), which contains a disulfide bond generated by cysteine residues that replace Ser44 of $V_H$ and Gly 100 of $V_L$ (e.g., D2C7-(scdsFv)-PE38KDEL IT), as described in U.S. Pat. Nos. 9,492,564 & 10,072,084, the contents of which are incorporated by reference in its entirety with regard to the immunotoxin. The D2C7 (scdsFv) was fused to DNA for domains II and III of *Pseudomonas* exotoxin A, PE38, (SEQ ID NO:7). The PE38 can further be modified at the c-terminus with additional moieties.

Other moieties which can be attached to the immunotoxin include those which provide additional beneficial properties. For example, a KDEL (lys-asp-glu-leu; SEQ ID NO:14) tetra-peptide can be added at the carboxy-terminus of the protein to provide retention in the endoplasmic reticulum. Variants such as DKEL (SEQ ID NO:19), RDEL (SEQ ID NO:15), and KNEL (SEQ ID NO: 17) which function similarly can also be used.

Tumors which can be treated with the combination regimen comprising the immunotoxin and the anti-CD40 agonist antibody, or the immunotoxin, anti-CD40 agonist antibody, and a checkpoint inhibitor comprising one or more of an anti-PD1 antibody or an anti-PD-L1 antibody ("combination therapy") are any that react with the D2C7 antibody or binding fragment thereof (e.g., an antibody comprising the CDR1, CDR2, and CDR3 regions as shown in SEQ ID NO: 1-6, and as described in Zalutsky et al. Radioimmunotargeting of malignant glioma by monoclonal antibody D2C7 reactive against both wild-type and variant III mutant epidermal growth factor receptors. Nucl Med Biol. 2012; 39 (1): 23-34, or the D2C7-IT described herein) or that express on the surface of the tumor cells EGFR. These include but are not limited to those in which at least one EGFRvIII allele is present. These may be found in tumors of the breast, head and neck, brain (e.g., glioblastoma multiforme, or astrocytoma), lung, or other solid tumors. It may be desirable to determine the presence of such an allele prior to combination therapy. This can be done using an oligonucleotide-based technique, such as PCR, or using an immunological technique, such as immunohistochemistry. It may be desirable to determine the amount, fraction, ratio, or percentage of cells in the tumor which express EGFRwt and/or EGFRVIII. The more cells which express EGFR on their surfaces, the more beneficial such combination therapy is likely to be. Even tumors that express little to no EGFRVIII may be treated due to the ability of the immunotoxin to bind to wild-type EGFR. Optionally, tumors may be tested prior to treatment for reactivity with D2C7 antibody using a detectable moiety coupled to the antibody, and visualization methods standard in the art. The immunotoxin itself could be used as an immunohistochemistry agent, before treatment, during treatment, or after treatment. A secondary reagent could be used with the immunotoxin for detection. It could, for example, recognize the *Pseudomonas* component of the immunotoxin.

Each of the immunotoxin, anti-CD40 agonist antibody, and checkpoint inhibitor (anti-PD1 antibody or an anti-PD-L1 antibody) may be administered by any appropriate (e.g., given the location of the tumor, and health of the patient receiving the therapy) technique known in the art. These include intravenous, oral, intraperitoneal, sublingual, intrathecal, intracavitary, intramuscularly, infusion, and subcutaneously. Compartmental or localized delivery may be desirable to avoid cytotoxicity should normal tissues express EGFR. Suitable compartmental or localized delivery methods include, but are not limited to delivery via a catheter, intratumoral delivery, application to a surgically created tumor resection cavity, and delivery to tumor parenchyma.

Tumors which can be treated by the method of the present invention are any which express epidermal growth factor receptor (EGFR), whether wild type, EGFRvIII, or other variants. Preferably the tumor expresses the receptor in amounts far exceeding expression by normal tissues. The mechanism of high level expression may be by genetic amplification, or other alterations, whether genetic or epigenetic, or post-translational modification. Exemplary tumors which can be treated include without limitation: malignant gliomas, breast cancer, head and neck squamous cell carcinoma, and lung cancer. The EGFR was found to act as a strong prognostic indicator in head and neck, ovarian, cervical, bladder and oesophageal cancers. In these cancers, increased EGFR expression was associated with reduced recurrence-free or overall survival rates in 70% (52/74) of studies. In gastric, breast, endometrial and colorectal cancers, the EGFR provided more modest prognostic information, correlating to poor survival rates in 52% (13/25) (see, Nicholson R I, Gee J M, Harper M E. EGFR and cancer prognosis. Eur J Cancer. 2001 September; 37 Suppl 4: S9-15. doi: 10.1016/s0959-8049 (01) 00231-3. PMID: 11597399).

Checkpoint inhibitors that comprise anti-PD1 antibodies or anti-PDL1-antibodies or fragments thereof are known to those skilled in the art, and include, but are not limited to, cemiplimab, nivolumab, pembrolizumab, MEDI0680 (AMP-514), spartalizumab, camrelizumab, sintilimab, toripalimab, dostarlimab, and AMP-224. Checkpoint inhibitors that comprise anti-PD-L1 antibodies known to those skilled in the art include, but are not limited to, atezolizumab, avelumab, durvalumab, and KN035. The antibody may comprise a monoclonal antibody (mAb), chimeric antibody, antibody fragment, single chain, or other antibody variant construct, as known to those skilled in the art. PD-1 inhibitors may include, but are not limited to, for example, PD-1 and PD-L1 antibodies or fragments thereof, including, nivolumab, an anti-PD-1 antibody, available from Bristol-Myers Squibb Co and described in U.S. Pat. Nos. 7,595,048, 8,728,474, 9,073,994, 9,067,999, 8,008,449 and 8,779,105; pembrolizumab, and anti-PD-1 antibody, available from Merck and Co and described in U.S. Pat. Nos. 8,952,136, 83,545,509, 8,900,587 and EP2170959; atezolizumab is an anti-PD-L1 available from Genentech, Inc. (Roche) and described in U.S. Pat. No. 8,217,149; avelumab (Bavencio, Pfizer, formulation described in PCT Publ. WO2017097407), durvalumab (Imfinzi, Medimmune/Astra-Zeneca, WO2011066389), cemiplimab (Libtayo, Regeneron Pharmaceuticals Inc., Sanofi, see, e.g., U.S. Pat. Nos. 9,938, 345 and 9,987,500), spartalizumab (PDR001, Novartis), camrelizumab (AiRuiKa, Hengrui Medicine Co.), sintilimab (Tyvyt, Innovent Biologics/Eli Lilly), KN035 (Envafolimab, Tracon Pharmaceuticals, see, e.g., WO2017020801A1); tislelizumab available from BeiGene and described in U.S. Pat. No. 8,735,553; among others and the like. Other PD-1 and PD-L1 antibodies that are in development may also be used in the practice of the present invention, including, for example, PD-1 inhibitors including toripalimab (JS-001, Shanghai Junshi Biosciences), dostarlimab (GlaxoSmithKline), INCMGA00012 (Incyte, MarcoGenics), AMP-224 (AstraZeneca/MedImmune and GlaxoSmithKline), AMP-514 (AstraZeneca), and PD-L1 inhibitors including AUNP12 (Aurigene and Laboratoires), CA-170 (Aurigen/Curis), and BMS-986189 (Bristol-Myers Squibb), among others (the references citations regarding the antibodies noted above are incorporated by reference in their entireties with respect to the antibodies, their structure and sequences). Fragments of PD-1 or PD-L1 antibodies include those fragments of the antibodies that retain their function in binding PD-1 or PD-L1 as known in the art, for example, as described in AU2008266951 and Nigam et al. "Development of high affinity engineered antibody fragments targeting PD-L1 for immunoPED," J Nucl Med May 1, 2018 vol. 59 no. supplement 1 1101, the contents of which are incorporated by reference in their entireties.

Anti-CD40 agonist antibodies comprise (a) antibodies that bind to CD40 on the surface of a cell and stimulate CD40 signaling as a result of the binding; (b) can modulate tumor-associated macrophages' immunosuppressive effect on development of a T cell-mediated antitumor response; and (c) generally, comprise antibodies whose binding domains recognize an epitope in either the cysteine rich domain 1 ("CRD1") region of CD40 (CREKQYLINSQCCSLCQPGQKLVSDCT-EFTETECLP; SEQ ID NO:8) or an epitope in or overlapping the N-terminal portion of cysteine rich domain 2 ("CRD2") region of CD40 (CGESEFL-DTWNRETHC; SEQ ID NO:9). Typically, the antibody is a monoclonal antibody or chimeric or humanized antibody. For example, there are at least 3 anti-CD40 agonist antibodies used in human clinical trials including CP870.893 (selicrelumab, RO7009789, Hoffman-La Roche, https://www.genome.jp/dbget-bin/www_bget?dr: D11491), APX005M (Apexigen), JNJ-64457107 (Alligator Bioscience), CDX-1140H (Celldex Therapeutics, Vitale et al., Development of CDX-1140, an agonist CD40 cancer Immunother 2019; 68:233-45. antibody for immunotherapy. Cancer Immunol 10.1007/s00262-018-2267-0), ChiLob 7/4 (Johnson P, Challis R, Chowdhury F, et al., Clinical and biological effects of an agonist anti-CD40 antibody: a Cancer Research UK phase I study. Clin Cancer Res 2015; 21:1321-8. 10.1158/1078-0432.CCR-14-2355), SEA-CD40 (Seattle Genetics, Gardai S J, et al. Abstract 2472: SEA-CD40, a sugar engineered non-fucosylated anti-CD40 antibody with improved immune activating capabilities. Proceedings of the 106th Annual Meeting of the American Association for Cancer Research; 2015 Apr. 18-22; Philadelphia, PA. Philadelphia (PA): AACR; Cancer Res 2015; 75 (15 Suppl): Abstract nr 2472 10.1158/1538-7445.AM2015-2472), 2141-V11, and SGN40 (dacetuzumab, Seattle Genetics), (see, e.g., Piechutta M, Berghoff A S. New emerging targets in cancer immunotherapy: the role of Cluster of Differentiation 40 (CD40/TNFR5). ESMO Open. 2019; 4 (Suppl 3): e000510. Published 2019 Jun. 12. doi: 10.1136/esmoopen-2019-000510). These three anti-CD40 agonist antibodies bind to an epitope in CRD1 of CD40. Deleting the A1 domain of CRD1 (CREKQYLINSQC; SEQ ID NO: 10,) resulted in a greater than 90% reduction in binding of SGN40 and ChiLob 7/4 and a total loss of binding for CP870.893. Also, while both human IgG isotypes IgG1 and IgG2 can contribute to agonistic activity of anti-CD40 antibodies, data suggests that IgG2 was the most active of the human isotypes in contributing to the agonistic activity.

Further, CD40 agonist antibodies may include modifications to their Fc portion of the antibody which improve binding to FcγRIIb and which may increase agonist activity. Such modifications include amino acid substitutions or changes in glycosylation (e.g., defucosylation) as known to those skilled in the art. Combinations of anti-CD40 agonist antibodies may be used in combination with the immunotoxin.

The anti-CD40 agonist antibody and/or checkpoint inhibitor may be administered at the same time (e.g., concurrently), before (e.g., prior to), or after (e.g., subsequent to) the immunotoxin. Typically, the agents (the immunotoxin, anti-CD40 agonist antibody, and checkpoint inhibitor) will be administered within 30, 28, 21, 14, 7, 4, 2, 1 or 0 day(s) of each other. The agents may be given repeatedly, either serially or in a cycle of first agent, the second agent, and third agent (the terms "first", "second", and "third" are used to distinguish between the agents, such as in an order of administration) such as in the discretion of a medical professional. It may be advantageous but not necessary for the immunotoxin to be administered prior to the anti-CD40 agonist antibody, and the checkpoint inhibitor, but the reverse order may also be used. Priming of a cytotoxic T lymphocyte response by the immunotoxin may take from about 5 to about 14 days. Administration of the anti-CD40 agonist antibody may beneficially be commenced during or after the priming period. Administration of the checkpoint inhibitor may beneficially be commenced before, during, or after such priming period. Some clinical studies using anti-CD40 agonist antibody used a single administration, whereas other studies utilized a regimen comprising repeated administration (e.g., weekly intervals). The frequency, order of administration, doses and dosage regimen of each agent in the combination therapy can be determined by a physician, taking into account the medical literature, the health, age and sex of the individual, the cancer to be treated, the mode of administration and dosing schedule of the composition or combination therapy, and other relevant considerations.

For example, anti-CD40 agonist antibody may be administered to an individual in an amount and at a suitable frequency to be therapeutically effective. For example, the anti-CD40 agonist antibody may be administered in a single administration (e.g., in a range of from 0.01 mg/kg to 10 mg/kg). In another example, the anti-CD40 agonist antibody may be administered in multiple intervals (e.g., daily, weekly, biweekly, monthly) at one or more doses (e.g., ranging from 2 doses, 4 doses, 5 doses, 6 doses, 8 doses, 12 doses, or more). Such doses can range from 0.6 μg/kg to 60 μg/kg; 0.01 mg/kg to 5 mg/kg; 0.5 mg to total dose (after 4 administrations) of 2 mg; 0.03 mg/kg to 0.3 mg/kg, 1 mg to 16 mg; and 75 μg/kg to 2000 μg/kg. In a method of treatment provided herein, an immunotoxin may be administered to an individual in an amount and at a suitable frequency to be therapeutically effective.

For example, an immunotoxin may be administered once, twice weekly, once each week, once every 2 weeks, once every 3 weeks, once each month, once every two months, once every 3 months, once every 4 months, once every 5 months, or once every 6 months. Doses of immunotoxin that may be administered in the combination therapy may range from 10 ng/ml to 25,000 ng/ml, such as between 100 ng/ml to 1,000 ng/ml, 1000 ng/ml to 3000 ng/ml, 3000 ng/ml to 6000 ng/ml, 6000 ng/ml to 10,000 ng/nl, and 10,000 ng/ml to 25,000 ng/ml. In a method of treatment provided herein, a checkpoint inhibitor may be administered to an individual in an amount and at a suitable frequency to be therapeutically effective.

For example, the checkpoint inhibitor may be administered once, twice, once every certain number of days, once each week, once every 2 weeks, once every 3 weeks, once each month, once every two months, once every 3 months, once every 4 months, once every 5 months, or once every 6 months. Doses of the checkpoint inhibitor that may be administered in the combination therapy may range from 0.1 mg/kg to 10 mg/kg, such as between 0.5 mg/kg to 3 mg/kg, 2 mg/kg to 3 mg/kg, 3 mg/kg to 6 mg/kg, and 6 mg/kg to 10 mg/kg. The checkpoint inhibitor may be administered in maintenance therapy, a length of time depending on assessment of clinical parameters for assessing response to therapy.

In addition to treatment with the immunotoxin and anti-CD40 agonist antibody, or immunotoxin, anti-CD40 agonist antibody, and checkpoint inhibitor, an individual with tumor may undergo further treatment regimens which may include one or more of surgical removal of the tumor, surgical reduction of the tumor, chemotherapy, biological therapy, radiotherapy. These modalities may be standard of care, depending on the disease state of the patient having tumor. The immunotoxin and anti-CD40 agonist antibody, or immunotoxin, anti-CD40 agonist antibody, and checkpoint inhibitor, may be administered before, during, or after the standard of care. The immunotoxin and anti-CD40 agonist antibody(s), or immunotoxin, anti-CD40 agonist antibody, and checkpoint inhibitor, may be administered after failure of the standard of care.

Kits may comprise, in a single divided or undivided container, the immunotoxin or its components or its encoding DNA and anti-CD40 agonist antibody or combination of anti-CD40 agonist antibody, and checkpoint inhibitor. Storage stability may vary between the three agents so separate vessels may be used. Optionally one or more of the agents may be lyophilized or frozen. A unitary composition comprising the immunotoxin (D2C7-IT) in combination with the anti-CD40 agonist antibody are also provided. The composition may further comprise the checkpoint inhibitor as described herein. The composition may be lyophilized or frozen.

Immunotoxin therapy can induce a secondary anti-tumor immune response, which is different from its direct killing mechanism, which needs the cooperation of the immune system. Since malignant tumors can comprise a heterogeneous mass, it is possible that some tumor cells can escape from the direct targeted attack of the immunotoxin therapy due to the lack of epitopes recognized by the immunotoxin. For this reason, the secondary anti-tumor immune response stimulated by the immunotoxin may play an important role in eliminating those tumor cells not directly targeted. However, it is discovered here that a combination therapy of immunotoxin and anti-CD40 agonist antibody, and the combination further comprising a checkpoint inhibitor, provides synergistic anti-tumor effect to achieve a synergistic therapeutic effect.

Administration of the immunotoxin in combination therapy can efficiently and directly kill cancer cells that express high levels of the targeted antigen through its unique cytotoxic mechanism. Cancer cells destroyed by localized immunotoxin therapy release tumor antigens and/or other neoantigens. These antigens can then be presented by the APCs, such as those activated by anti-CD40 agonist antibody, to host T cells in the local draining lymph nodes, which activate CTLs, in the presence of blockade of the PD1/PD-L1 pathway by checkpoint inhibitor, to migrate and eliminate the remaining or recurrent tumor cells expressing specific tumor antigens at the tumor site.

The above disclosure generally describes the present invention. All references disclosed herein are expressly incorporated by reference. A more complete understanding can be obtained by reference to the following specific examples which are provided herein for purposes of illustration only, and are not intended to limit the scope of the invention.

Example 1

Figure 2:
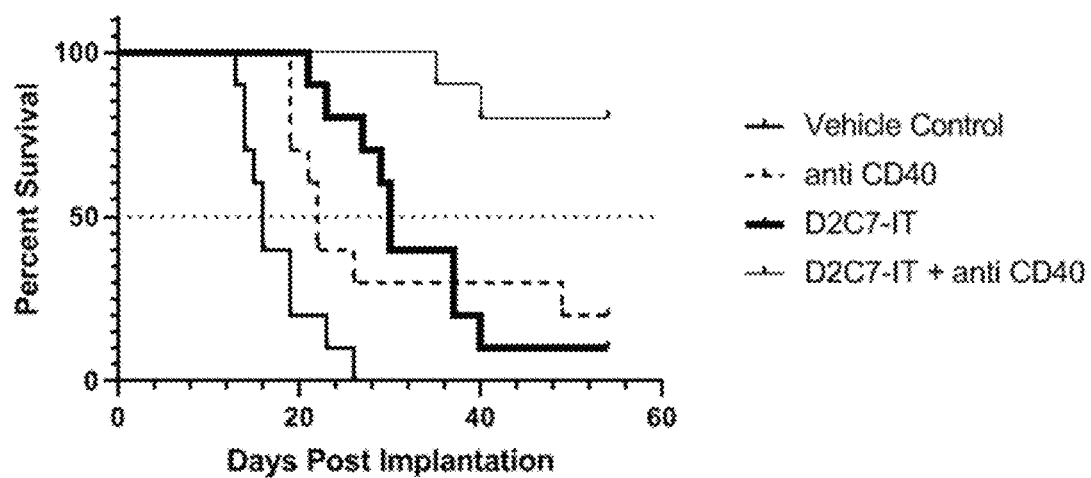
FIG. 2 is a graph showing an intracranial CT-2A-dmEGFRvIII-FFLuc intracranial glioma model showing the effects of treatment comparing percent survival to days post implantation of tumor. As compared to Vehicle Control, a single dose of the D2C7-IT monotherapy (bold black line), anti-CD40 agonist antibody (anti-CD40) monotherapy (hyphenated line), and D2C7-IT+anti-CD40 combination therapy (solid line) generated a statistically significant delay in tumor growth; with D2C7-IT+anti-CD40 combination therapy showing a synergistic effect in delaying tumor growth.

As an illustration of treatment of an individual having tumor with combination therapy comprising an immunotoxin (D2C7-IT) and an anti-CD40 agonist antibody, a standard experimental model of tumor in immunocompetent individuals was used. Established a mouse glioma line, CT-2A-D2C7, overexpressing mouse EGFRvIII and expressing firefly luciferase ("FFLuc") ("CT-2A-dmEGFRvIII-FFLuc"). C57BL/6J mice (~20 g, 6-8 weeks, female) were anesthetized and were implanted intracranially with a total of $2\times10^5$ CT-2A-dmEGFRvIII-Luc mouse glioma cells. Five days post tumor implantation, mice underwent bioluminescence imaging of tumor, and were then randomized into different treatment groups (10 mice/group). Anti-mouse CD40 agonist monoclonal antibody (Clone FGK4.5/FGK45) was purchased from a commercial source. As shown in FIG. 1, six days post tumor implantation the groups of mice were infused as follows. Group 1 received a negative control comprising 2% murine serum albumin in PBS (2% MSA-PBS) in combination with isotype control antibody (also known as Vehicle Control). Group 2 received anti-CD40 agonist antibody (300 µg total dose in 2% MSA-PBS; "CD40 mAb"). Group 3 received immunotoxin D2C7-IT (0.2 µg total dose in 2% MSA-PBS)+isotype control antibody. Group 4 received combination therapy comprising anti-CD40 agonist antibody (300 µg total dose in 2% MSA-PBS) and D2C7-IT immunotoxin (0.2 µg total dose). The different treatments were administered to the groups by convection-enhanced delivery (CED) at a rate of 0.5 µl/hour for 144 hours via osmotic mini-pumps. The antitumor response of intracranial (ic) tumors to treatment was assessed by measuring median survival of the treated individuals over the testing period. As shown in FIGS. 2 & 3, the median survival (50% survival) for the control group, Group 1, was 16 days; for Group 2 treated with anti-CD40 agonist antibody monotherapy was 22 days; for Group 3 treated with D2C7-IT monotherapy was 30 days; and for Group 4 receiving both D2C7-IT and anti-CD40 agonist antibody was not yet reached after concluding the study at day 54. Thus, these data indicate that anti-CD40 agonist antibody can synergize with immunotoxin in generating a durable and long lasting antitumor immune response against malignant tumor expressing EGFR or variant thereof such as EGFRvIII.

As shown in FIG. 3, at conclusion of the study and using bioluminescence imaging for tumor detection, 2 out of 10 individuals treated with anti-CD40 agonist antibody monotherapy (Group 2) were tumor-free; 1 out of 10 individuals treated with D2C7-IT monotherapy (Group 3) were tumor-free; and 8 out of 10 individuals treated with both D2C7-IT and anti-CD40 agonist antibody (Group 4) were tumor-free. Thus, these data indicate that anti-CD40 agonist antibody can synergize with immunotoxin in generating a durable and long lasting antitumor immune response against malignant tumor expressing EGFR or variant thereof such as EGFRvIII.

Example 2

Using the standard experimental model of tumor in immunocompetent individuals as described in Example 1, illustrated is the treatment of an individual having tumor with combination therapy comprising an immunotoxin (D2C7-IT), an anti-CD40 agonist antibody, and a checkpoint inhibitor for the blockade of the PD1/PD-L1 pathway. Six days post tumor implantation, the groups of mice (10 mice per group) were treated as follows (with D2C7-IT and anti-CD40 agonist Ab being administered intracranially, and anti-PD-1 mAb administered intraperitoneally). Group 1 received 2% murine serum albumin in PBS (2% MSA-PBS) in combination with isotype control antibodies for both anti-CD40 agonist antibody and the checkpoint inhibitor antibody ("Vehicle Control", Table 1). Group 2 received immunotoxin D2C7-IT (0.1 µg total dose in 2% MSA-PBS) in combination with isotype control antibodies for both anti-CD40 agonist antibody and the checkpoint inhibitor antibody ("D2C7-IT", Table 1). Group 3 received anti-CD40 agonist antibody (30 µg total dose in 2% MSA-PBS)+isotype control antibody for the checkpoint inhibitor antibody ("αCD40", Table 1). Group 4 received 2% MSA-PBS in combination with isotype control antibody for the anti-CD40 agonist antibody, and 250 µg of anti-PD-1 mAb ("αPD-1", Table 1). Group 5 received the immunotoxin D2C7-IT (0.1 µg total dose in 2% MSA-PBS) in combination with anti-CD40 agonist antibody (30 µg total dose in 2% MSA-PBS) and isotype control antibody for the checkpoint inhibitor antibody ("D2C7-IT+αCD40", Table 1). Group 6 received immunotoxin D2C7-IT (0.1 µg total dose in 2% MSA-PBS) in combination with isotype control antibody for anti-CD40 agonist antibody, and 250 µg of anti-PD-1 mAb ("D2C7-IT+αPD-1 mAb", Table 1). Group 7 received anti-CD40 agonist antibody (30 µg total dose in 2% MSA-PBS) and 250 µg of anti-PD-1 mAb (("αCD40+αPD-1 mAb", Table 1). Group 8 received anti-CD40 agonist antibody (30 µg total dose in 2% MSA-PBS), 250 µg of anti-PD-1 mAb, and D2C7-IT immunotoxin (0.1 µg total dose) ("D2C7-IT+αCD40+αPD-1 mAb", Table 1).

The antitumor response of each treatment was assessed by measuring the median survival of each treated group over the testing period. The median survivals were compared among the 8 treated groups, and results subject to statistical analysis as compared to the Vehicle Control, as shown in Table 1.

TABLE 1

| Treatment Group | Median Survival | Number surviving measured days post tumor implant | Comparison to Vehicle (Wilcoxon test) |
|---|---|---|---|
| Vehicle Control | 17.5 | 0/10 | — |
| D2C7-IT | 24 | 1/10 | 0.0044 (**) |
| αCD40 | 28.5 | 3/10 | 0.1334 |
| αPD-1 | 23.5 | 3/10 | 0.0570 |
| D2C7-IT + αCD40 | >59.5 | 5/10 | 0.0016 (**) |
| D2C7-IT + αPD-1 | >70 | 6/10 | 0.0052 (**) |
| αCD40 + αPD-1 | >57 | 5/10 | 0.0007 (***) |
| D2C7-IT + αCD40 + αPD-1 | >75 | 9/10 | <0.0001 (****) |

As shown in Table 1, the median survival (50% survival) of individuals receiving combination treatment comprising immunotoxin and anti-CD40 agonist antibody was significantly higher (51.5 days) than the median survival of individuals receiving monotherapy with with ether immunotoxin (24 days) or anti-CD40 agonist antibody (28.5 days). Likewise, the median survival for individuals receiving combination treatment comprising immunotoxin, anti-CD40 agonist antibody and checkpoint inhibitor was significantly higher (greater than 54 days) than the median survival of individuals treated with monotherapy with either immunotoxin (24 days) or anti-CD40 agonist antibody (28.5 days). Thus, these data indicate that immunotoxin can synergize with anti-CD40 agonist antibody, and with both anti-CD40 agonist antibody and checkpoint inhibitor, in generating a durable and long lasting antitumor immune response against malignant tumor expressing EGFR or variant thereof such as EGFRvIII.

As shown in Table 1, at conclusion of the study and using bioluminescence imaging for tumor detection: 3 out of 10 individuals treated with anti-CD40 agonist antibody monotherapy (Group 3) were tumor-free; 1 out of 10 individuals treated with D2C7-IT monotherapy (Group 2) was tumor-free; 5 out of 10 individuals receiving a combination comprising D2C7-IT and anti-CD40 agonist antibody (Group 5) were tumor-free; and 9 out of 10 individuals receiving a combination comprising D2C7-IT, anti-CD40 agonist antibody, and checkpoint inhibitor (Group 8) were tumor-free. Thus, these data indicate that anti-CD40 agonist antibody and immunotoxin can synergize in generating a durable and long lasting antitumor immune response against malignant tumor expressing EGFR or variant thereof such as EGFRVIII; and that anti-CD40 agonist antibody, immunotoxin, and checkpoint inhibitor can synergize in generating a durable and long lasting antitumor immune response against malignant tumor expressing EGFR (EGFRwt or variant thereof such as EGFRvIII).

Example 3

Using the standard experimental model of tumor in immunocompetent individuals as described in Examples 1 & 2, provided is another illustration of the treatment of an individual having tumor with combination therapy comprising an immunotoxin (D2C7), an anti-CD40 agonist antibody, and a checkpoint inhibitor for the blockade of the PD1/PD-L1 pathway. Six days post tumor implantation, the groups of mice (5 mice per group) were treated as follows (with D2C7-IT and anti-CD40 agonist Ab being administered intracranially, and anti-PD-L1 mAb administered intraperitoneally). Group 1 received 2% murine serum albumin in PBS (2% MSA-PBS) in combination with isotype control antibodies for both anti-CD40 agonist antibody and the checkpoint inhibitor antibody ("Vehicle Control", Table 2). Group 2 received immunotoxin D2C7-IT (0.1 µg total dose in 2% MSA-PBS) in combination with isotype control antibodies for both anti-CD40 agonist antibody and the checkpoint inhibitor antibody ("D2C7-IT", Table 2). Group 3 received anti-CD40 agonist antibody (30 µg total dose in 2% MSA-PBS)+isotype control antibody for the checkpoint inhibitor antibody ("αCD40", Table 2). Group 4 received 2% MSA-PBS in combination with isotype control antibody for the anti-CD40 agonist antibody, and 250 µg of anti-PD-L1 mAb ("αPD-L1", Table 2). Group 5 received the immunotoxin D2C7-IT (0.1 µg total dose in 2% MSA-PBS) in combination with anti-CD40 agonist antibody (30 µg total dose in 2% MSA-PBS) and isotype control antibody for the checkpoint inhibitor antibody ("D2C7-IT+αCD40", Table 2). Group 6 received immunotoxin D2C7-IT (0.1 µg total dose in 2% MSA-PBS) in combination with isotype control antibody for anti-CD40 agonist antibody, and 250 µg of anti-PD-L1 mAb ("D2C7-IT+αPD-L1", Table 2). Group 7 received anti-CD40 agonist antibody (30 µg total dose in 2% MSA-PBS) and 250 µg of anti-PD-L1 mAb (("αCD40+αPD-L1", Table 2). Group 8 received αCD40 agonist antibody (30 µg total dose in 2% MSA-PBS), 250 µg of anti-PD-L1 mAb, and D2C7-IT immunotoxin (0.1 µg total dose) ("D2C7-IT+αCD40+αPD-L1", Table 2).

The antitumor response of each treatment was assessed by measuring the median survival of each treated group over the testing period. The median survivals were compared among the 8 treated groups, as shown in Table 2.

TABLE 2

| Treatment Group | Median Survival | Number surviving measured days post tumor implant |
|---|---|---|
| Vehicle Control | 14 | 0/5 |
| D2C7-IT | 35 | 1/5 |
| αCD40 | 23 | 0/5 |
| αPD-L1 | 15 | 0/5 |
| D2C7-IT + αCD40 | 47 | 2/5 |
| D2C7-IT + αPD-L1 | 36 | 2/5 |
| aCD40 + αPD-L1 | 40 | 2/5 |
| D2C7-IT + αCD40 + αPD-L1 | >84 | 4/5 |

As shown in Table 2, the median survival (50% survival) of individuals receiving combination treatment comprising immunotoxin and anti-CD40 agonist antibody was significantly higher (47 days) than the median survival of individuals receiving monotherapy with either immunotoxin (35 days) or anti-CD40 agonist antibody (23 days) alone. Likewise, the median survival for individuals receiving combination treatment comprising immunotoxin, anti-CD40 agonist antibody and checkpoint inhibitor was significantly higher (greater than 84 days) than the median survival of individuals treated with monotherapy with either immunotoxin (35 days) or anti-CD40 agonist antibody (23 days) alone. Thus, these data indicate that immunotoxin can synergize with anti-CD40 agonist antibody, and with both anti-CD40 agonist antibody and checkpoint inhibitor, in generating a durable and long lasting antitumor immune response against malignant tumor expressing EGFR comprising EGFRwt and/or variant thereof such as EGFRVIII.

As shown in Table 2, at conclusion of the study and using bioluminescence imaging for tumor detection: 0 out of 5 individuals treated with anti-CD40 agonist antibody monotherapy (Group 3) were tumor-free; 1 out of 5 individuals treated with D2C7-IT monotherapy (Group 2) was tumor-free; 2 out of 5 individuals receiving a combination comprising D2C7-IT and anti-CD40 agonist antibody (Group 5) were tumor-free; and 4 out of 5 individuals receiving a combination comprising D2C7-IT, anti-CD40 agonist antibody, and checkpoint inhibitor (Group 8) were tumor-free. Thus, these data indicate that anti-CD40 agonist antibody and immunotoxin can synergize in generating a durable and long lasting antitumor immune response against malignant tumor expressing EGFR; and that anti-CD40 agonist antibody, immunotoxin, and checkpoint inhibitor can synergize in generating a durable and long lasting antitumor immune response against malignant tumor expressing EGFR comprising EGFRwt or variant thereof such as EGFRVIII.

Example 4

Construction, Expression, and Purification of D2C7-(scdsFv)-PE38KDEL Immunotoxin.

The carboxyl terminus of the D2C7 $V_H$ domain was connected to the amino terminus of the $V_L$ domain by a 15-amino-acid peptide $(Gly_4Ser)_3$ linker. In order to obtain a stable IT, it is essential to ensure that during renaturation $V_H$ is positioned near $V_L$. This was achieved by mutating a single key residue in each chain to cysteine, for the stabilizing disulfide bond to form. On the basis of predictions using molecular modeling and empirical data with other dsFv-recombinant ITs, we chose one amino acid in each chain to mutate to cysteine. These are residues 44 in the framework region 2 (FR2) of $V_H$ and 100 in the FR4 of $V_L$ (according to the Kabat numbering). Thus, we prepared an Fv that contains both a peptide linker and a disulfide bond generated by cysteine residues that replace Ser44 of $V_H$ and Gly 100 of $V_L$. The D2C7 (scdsFv) PCR fragment was then fused to DNA for domains II and III of *Pseudomonas* exotoxin A. The version of *Pseudomonas* exotoxin A used here, PE38KDEL, has a modified C terminus which increases its intracellular retention, in turn enhancing its cytotoxicity. The D2C7-(scdsFv)-PE38KDEL was expressed in *E. coli* under the control of T7 promoter and harvested as inclusion bodies.

We claim:

1. A method of treating a solid tumor expressing one or more of EGFRwt and EGFRvIII in an individual, comprising:
    administering to the individual a therapeutically effective amount of an immunotoxin comprising a single chain variable region antibody fused to a truncated *Pseudomonas* exotoxin comprising PE38, wherein the single chain variable region antibody comprises a variable heavy chain comprising CDR1 of SEQ ID NO: 1, CDR2 of SEQ ID NO: 2, and CDR3 of SEQ ID NO: 3 and a variable light chain comprising CDR1 of SEQ ID NO: 4, CDR2 of SEQ ID NO: 5 and CDR3 of SEQ ID NO: 6; and
    concurrently administering a therapeutically effective amount of an anti-CD40 agonist antibody to the individual, wherein the immunotoxin and anti-CD40 agonist antibody are administered intratumorally.

2. The method of claim 1, further comprising administering to the individual a therapeutically effective amount of a checkpoint inhibitor comprising one or more of an anti-PD1 antibody or anti-PD-L1 antibody.

3. The method of claim 2, wherein the checkpoint inhibitor is administered within 30 days of administering the immunotoxin.

4. The method of claim 2, wherein the checkpoint inhibitor is administered within between 7 and 14 days of administering the immunotoxin.

5. The method of claim 1, wherein the tumor is a malignant glioma.

6. The method of claim 1, wherein the tumor is breast cancer.

7. The method of claim 1, wherein the tumor is head and neck squamous cell carcinoma.

8. The method of claim 1, wherein the tumor is lung cancer.

9. The method of claim 1, wherein the truncated *Pseudomonas* exotoxin is fused to a KDEL (SEQ ID NO:14) peptide.

10. The method of claim 1, further comprising repeated administration of a therapeutically effective amount of an anti-CD40 agonist antibody to the individual.

11. The method of claim 10, wherein the repeated administration of the anti-CD40 agonist antibody is administered subcutaneously.

12. A kit for treating a tumor, comprising:
- an immunotoxin comprising a single chain variable region antibody fused to a truncated *Pseudomonas* exotoxin comprising PE38, wherein the single chain variable region antibody has a variable heavy chain comprising CDR1 of SEQ ID NO: 1, CDR2 of SEQ ID NO: 2, and CDR3 of SEQ ID NO: 3 and a variable light chain comprising CDR1 of SEQ ID NO: 4, CDR2 of SEQ ID NO: 5, and CDR3 of SEQ ID NO: 6; and
- an anti-CD40 agonist antibody, wherein the immunotoxin and anti-CD40 agonist antibody are formulated for intratumoral delivery.

13. The kit of claim 12, wherein the truncated *Pseudomonas* exotoxin is fused to a KDEL (SEQ ID NO: 14) peptide.

14. The kit of claim 12, further comprising a checkpoint inhibitor comprising one or more of an anti-PD-1 antibody and an anti-PD-L1 antibody.

15. A composition formulated for intratumoral delivery comprising an immunotoxin comprising a single chain variable region antibody fused to a truncated *Pseudomonas* exotoxin comprising PE38, wherein the single chain variable region antibody has a variable heavy chain comprising CDR1 of SEQ ID NO: 1, CDR2 of SEQ ID NO: 2, and CDR3 of SEQ ID NO: 3 and a variable light chain comprising CDR1 of SEQ ID NO: 4, CDR2 of SEQ ID NO: 5, and CDR3 of SEQ ID NO: 6; and an anti-CD40 agonist antibody.

16. The composition of claim 15, further comprising a checkpoint inhibitor comprising one or more of an anti-PD-1 antibody and an anti-PD-L1 antibody.

\* \* \* \* \*